(12) United States Patent
Schuchter

(10) Patent No.: US 8,131,238 B2
(45) Date of Patent: Mar. 6, 2012

(54) CARRIER SIGNAL DETECTION

(75) Inventor: Walter Schuchter, Graz (AT)

(73) Assignee: Infineon Technologies AG, Neubiberg (DE)

( * ) Notice: Subject to any disclaimer, the term of this patent is extended or adjusted under 35 U.S.C. 154(b) by 1019 days.

(21) Appl. No.: 12/052,119

(22) Filed: Mar. 20, 2008

(65) Prior Publication Data

US 2009/0239490 A1   Sep. 24, 2009

(51) Int. Cl.
   *H04B 17/00* (2006.01)
(52) U.S. Cl. .................... 455/226.2; 455/334
(58) Field of Classification Search .......... 455/226.1, 455/226.2, 226.3, 229, 334, 337, 340
   See application file for complete search history.

(56) References Cited

U.S. PATENT DOCUMENTS

| | | | |
|---|---|---|---|
| 5,355,114 A | 10/1994 | Sutterlin et al. | |
| 5,815,534 A | 9/1998 | Glass | |
| 6,163,580 A | 12/2000 | Jackson et al. | |
| 6,166,566 A | 12/2000 | Strong | |
| 6,393,069 B1 | 5/2002 | Shibata | |
| 6,671,331 B1 | 12/2003 | Sakuma | |
| 2006/0136997 A1* | 6/2006 | Telek et al. | 726/5 |
| 2006/0149541 A1* | 7/2006 | Jaklitsch et al. | 704/226 |
| 2007/0236336 A1 | 10/2007 | Borcherding | |

OTHER PUBLICATIONS

Agilent Technologies application note entitled "Agilent TS-5020 Tire Pressure Monitoring System (TPMS)"; Dec. 11, 2006; 4 pgs.
Atmel Corporation brochure entitled "Interface IC for 125 kHz Wake-Up Function ATA5283"; Mar. 2007; 14 pgs.

* cited by examiner

*Primary Examiner* — Nhan Le
(74) *Attorney, Agent, or Firm* — Dicke, Billig & Czaja, PLLC

(57) ABSTRACT

A method of detecting a carrier signal includes generating a first signal that represents a strength of a received signal. A variable threshold signal is generated based on the first signal. A fixed threshold signal is generated. The method includes detecting whether a carrier signal is present in the received signal based on a comparison of the first signal with a sum of the variable threshold signal and the fixed threshold signal.

22 Claims, 4 Drawing Sheets

CARRIER SIGNAL DETECTION

BACKGROUND

Low-power, low-frequency (e.g., 125 kHz) wakeup receivers with carrier detection are used in, for example, tire pressure monitoring systems (TPMS). A main challenge in making such receivers is to provide low power consumption, and a high carrier detector sensitivity level without calibration.

SUMMARY

One embodiment provides a method of detecting a carrier signal. The method includes generating a first signal that represents a strength of a received signal. A variable threshold signal is generated based on the first signal. A fixed threshold signal is generated. The method includes detecting whether a carrier signal is present in the received signal based on a comparison of the first signal with a sum of the variable threshold signal and the fixed threshold signal.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
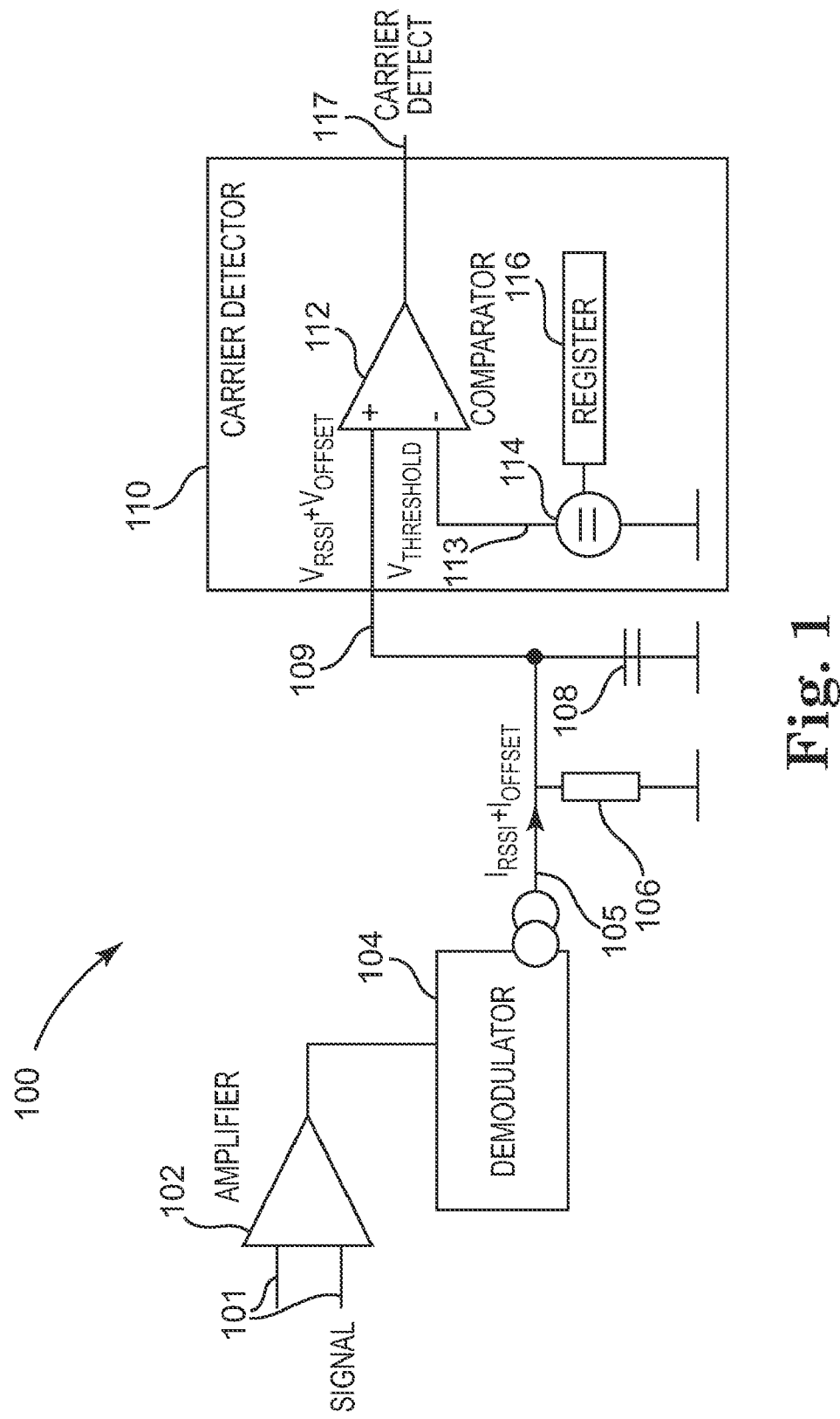
FIG. 1 is a diagram illustrating an example receiver including a carrier detection circuit.

FIG. 1 is a diagram illustrating an example receiver 100 including a carrier detection circuit 110. Receiver circuit 100 includes amplifier 102, demodulator 104, resistor 106, capacitor 108, and carrier detector 110. Carrier detector 110 includes comparator 112, voltage source 114, and register 116. In operation, amplifier 102 receives a signal on lines 101, amplifies the signal, and outputs the amplified signal to demodulator 104. Demodulator 104 performs amplitude shift key (ASK) demodulation on the amplified signal, and outputs a demodulated signal in the form of a current ($I_{RSSI}+I_{Offset}$) on line 105. The current, $I_{RSSI}$, is a received signal strength indicator (RSSI) current, and the current, $I_{Offset}$, is an offset current. Resistor 106 and capacitor 108 are configured as a low-pass filter that converts the current ($I_{RSSI}+I_{Offset}$) on line 105 to a corresponding low-pass filtered voltage signal ($V_{RSSI}+V_{Offset}$), which is provided to carrier detector 110 on line 109.

The voltage signal ($V_{RSSI}+V_{Offset}$) on line 109 is received at the positive input of comparator 112. A threshold voltage ($V_{threshold}$) is received on line 113 at the negative input of comparator 112. The threshold voltage ($V_{threshold}$) is generated by voltage source 114, and output to comparator 112 on line 113. The magnitude of the threshold voltage ($V_{threshold}$) is controlled based on the contents of register 116. In one implementation, register 116 is a 3-bit register that is programmable by a controller (not shown). Comparator 112 continually compares the voltage signal ($V_{RSSI}+V_{Offset}$) on line 109 to the threshold voltage ($V_{threshold}$) on line 113, and outputs a logical-high carrier detect signal on line 117 when the voltage signal ($V_{RSSI}+V_{Offset}$) exceeds the threshold voltage ($V_{threshold}$), indicating that a carrier signal at a predefined frequency or range of frequencies (e.g., 125 kHz) is present in the signal received on lines 101. Comparator 112 outputs a logical-low carrier detect signal on line 117 when the voltage signal ($V_{RSSI}+V_{Offset}$) does not exceed the threshold voltage ($V_{threshold}$), indicating that a carrier signal at the predefined frequency or range of frequencies is not present in the signal received on lines 101.

Figure 2:
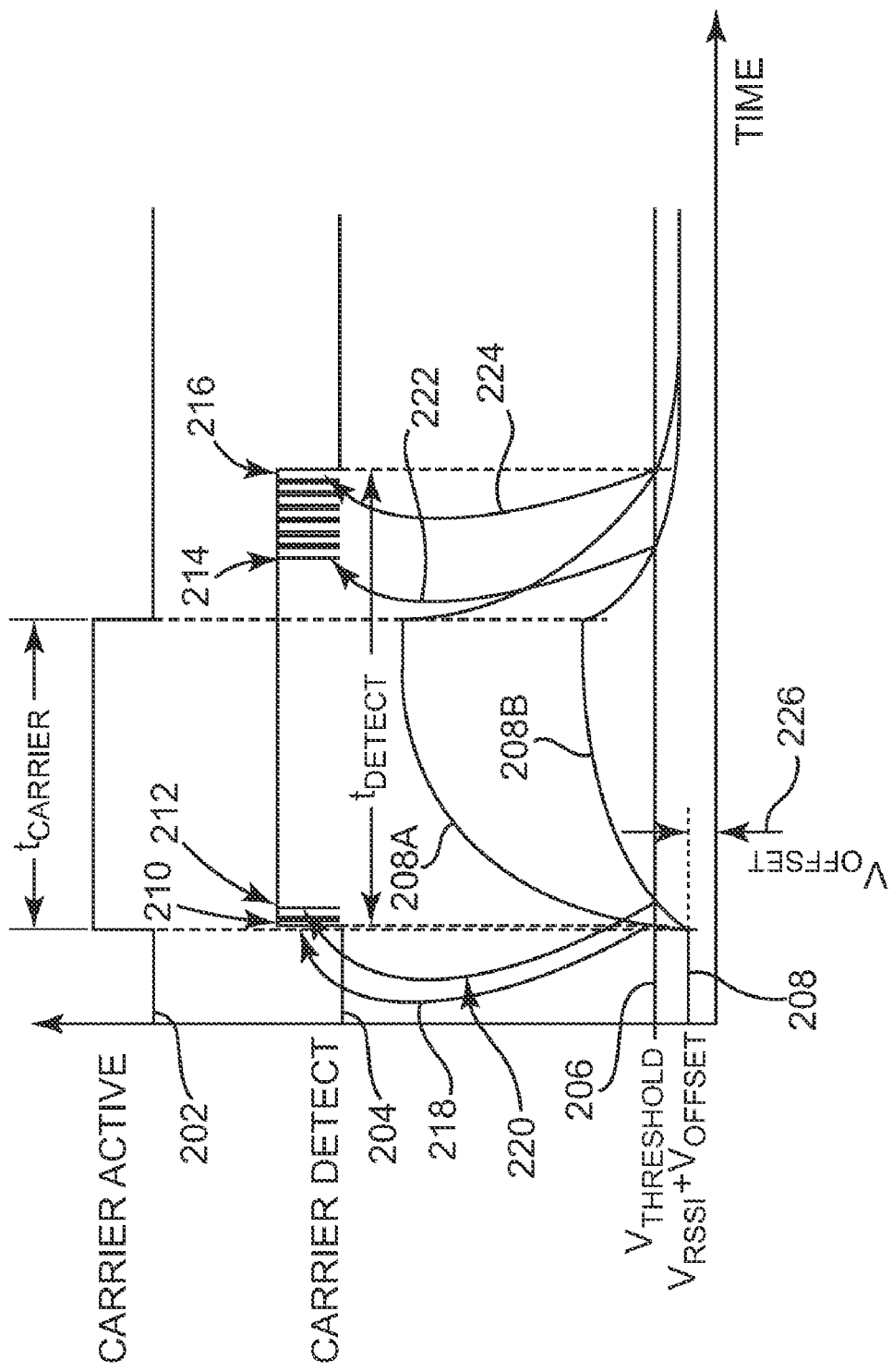
FIG. 2 is a diagram illustrating example signals generated by the receiver circuit shown in FIG. 1.

FIG. 2 is a diagram illustrating example signals generated by the receiver circuit 100 shown in FIG. 1. The signals include carrier active signal 202, carrier detect signal 204, $V_{threshold}$ signal 206, and $V_{RSSI}+V_{Offset}$ signal 208. Carrier active signal 202 represents the active time for a carrier signal received by circuit 100. Carrier detect signal 204 represents the signal output by comparator 112 on line 117. The $V_{threshold}$ signal 206 represents the signal received by comparator 112 on line 113. The $V_{RSSI}+V_{Offset}$ signal 208 represents the signal received by comparator 112 on line 109. The offset of the $V_{RSSI}+V_{Offset}$ signal 208 is represented in FIG. 2 by $V_{Offset}$ 226.

As shown in FIG. 2, the carrier active signal 202 starts out in a low state, and then transitions to a high state. The carrier active signal 202 remains in the high state for a time duration represented by $t_{carrier}$, and then signal 202 transitions back to a low state. The $V_{threshold}$ signal 206 remains constant during the entire time period shown in FIG. 2. Two example waveforms 208A and 208B are shown in FIG. 2 for the $V_{RSSI}+V_{Offset}$ signal 208. Both waveforms 208A and 208B begin with a magnitude that is less than the $V_{threshold}$ signal 206. When waveform 208A first transitions above the $V_{threshold}$ signal 206, comparator 112 causes the carrier detect signal 204 to transition to a high state at point 210, as indicated by arrow 218. The carrier detect signal 204 remains in the high state until the waveform 208A drops below the $V_{threshold}$ signal 206. Comparator 112 detects when the waveform 208A drops below the $V_{threshold}$ signal 206, and causes the carrier detect signal 204 to transition to a low state at point 216, as indicated by arrow 224. The carrier detect signal 204 remains in the high state for a time duration represented by $t_{detect}$. The pulse in the carrier detect signal 204 for the time duration, $t_{detect}$, is referred to as a wakeup pulse.

The transition times and the duration, $t_{detect}$, for the carrier detect signal 204 are dependent upon the magnitude of the $V_{RSSI}+V_{Offset}$ signal 208. In the illustrated example, the second waveform 208B has a smaller magnitude than the first waveform 208A. When waveform 208B first transitions above the $V_{threshold}$ signal 206, comparator 112 causes the carrier detect signal 204 to transition to a high state at point 212 (which is later in time than point 210 for waveform 208A), as indicated by arrow 220. The carrier detect signal 204 remains in the high state until the waveform 208B drops below the $V_{threshold}$ signal 206. Comparator 112 detects when the waveform 208B drops below the $V_{threshold}$ signal 206, and causes the carrier detect signal 204 to transition to a low state at point 214 (which is earlier in time than point 216 for waveform 208A), as indicated by arrow 222. Since the carrier detect signal 204 transitions to a high state later in time for waveform 208B than waveform 208A, and transitions back to a low state earlier in time for waveform 208B than waveform 208A, the time duration, $t_{detect}$, for waveform 208B is smaller than that for waveform 208A. For waveforms with magnitudes between those of waveforms 208A and 208B, the transition times of the carrier detect signal 204 will vary between points 210 and 212, and between points 214 and 216.

Receiver circuits that use a fixed carrier detector threshold have some disadvantages. Due to offsets in the amplifier and demodulator, a threshold calibration is typically needed to achieve high sensitivity. Such circuits typically produce a carrier detect signal with a prolonged duration, $t_{detect}$, that is not directly proportional to the duration, $t_{carrier}$, of the carrier signal, and that can have large variations depending on the power level of the RSSI signal.

Figure 3:
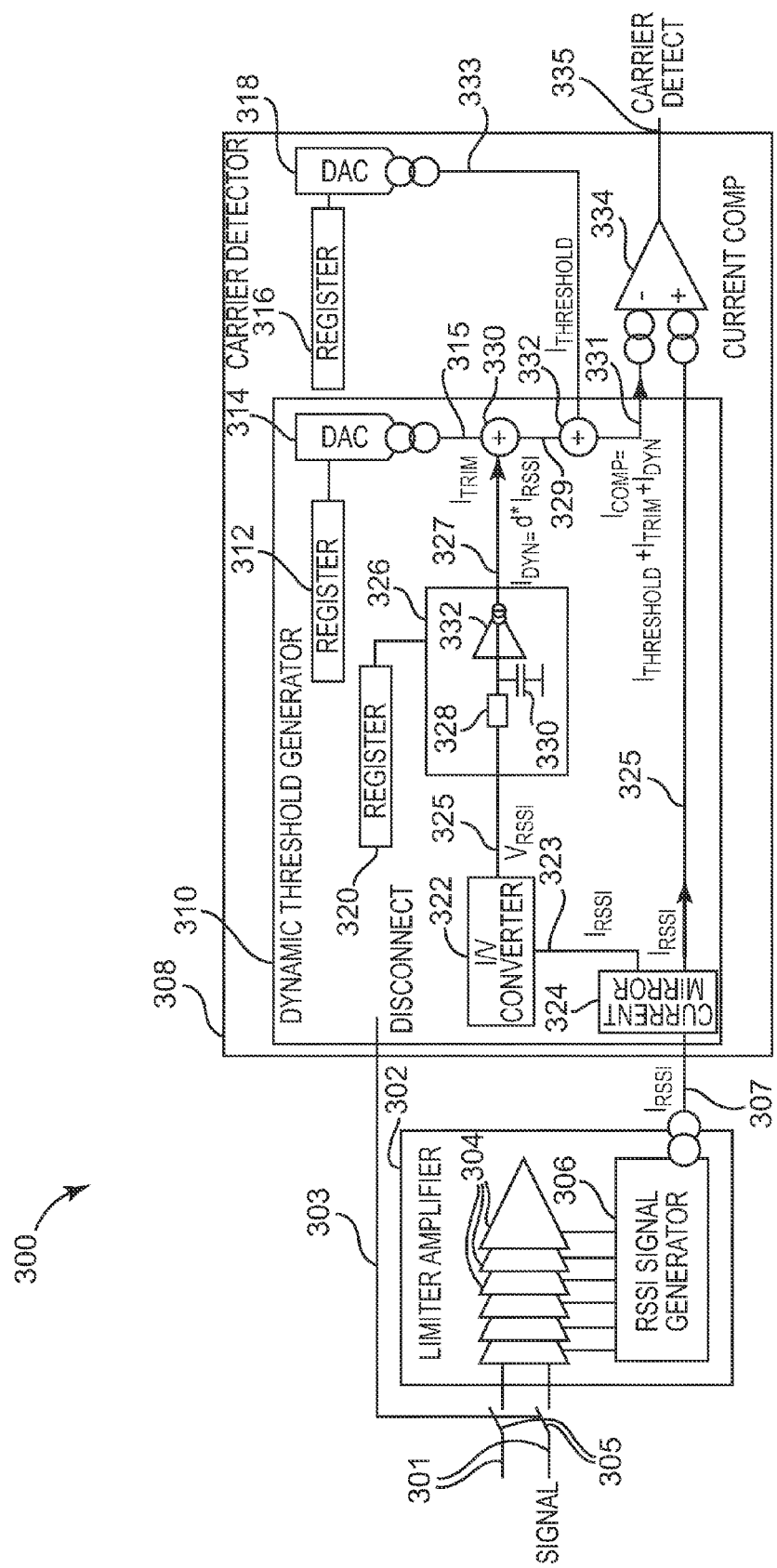
FIG. 3 is a diagram illustrating a receiver including a carrier detection circuit with a dynamic threshold generator according to one embodiment.

FIG. 3 is a diagram illustrating a receiver 300 including a carrier detection circuit 308 with a dynamic threshold generator 310 according to one embodiment. Receiver circuit 300 includes amplification and demodulation circuit 302, switches 305, and carrier detector 308. Circuit 302 includes a limiter amplifier comprising a plurality of cascaded amplifiers or amplifier stages 304, and a received signal strength indicator (RSSI) signal generator 306. Carrier detector 308 includes dynamic threshold generator 310, register 316, digital-to-analog converter (DAC) 318, and current comparator 334. Dynamic threshold generator 310 includes register 312, DAC 314, register 320, current-to-voltage converter (I/V converter) 322, current mirror 324, low-pass filter circuit 326, and adders 330 and 332. Filter circuit 326 includes resistor 328, capacitor 330, and amplifier 332.

In operation according to one embodiment, amplifiers 304 receive a signal on lines 301. In one embodiment, the signal on lines 301 is a low-frequency RF signal that is received via an antenna (not shown). In one embodiment, carrier detector 308 is configured to connect and disconnect lines 301 from amplifiers 304 via communication link 303 and switches 305. Amplifiers 304 amplify the received signal, and output the amplified signal to RSSI signal generator 306. RSSI signal generator 306 performs ASK demodulation on the amplified signal, and outputs a demodulated signal in the form of a current ($I_{RSSI}$) on line 307. The current, $I_{RSSI}$, is a received signal strength indicator (RSSI) current. The RSSI signal in the current domain ($I_{RSSI}$) is logarithmically proportional to the power of the carrier signal.

Current mirror 324 receives the current ($I_{RSSI}$) from line 307, and copies or mirrors the current onto lines 323 and 325. Current-to-voltage converter 322 converts the current ($I_{RSSI}$) on line 323 to a corresponding voltage ($V_{RSSI}$), and outputs the voltage on line 325. Resistor 328 and capacitor 330 are configured as a low-pass filter that continually filters the voltage signal on line 325 and generates a corresponding low-pass filtered voltage signal, which is provided to amplifier 332.

Amplifier 332 amplifies the received low-pass filtered voltage signal, and converts the voltage signal into a corresponding current signal, which is output on line 327. In one embodiment, amplifier 332 multiplies the received signal by a factor of d, where the value for the factor, d, varies based on the value stored in register 320. In one embodiment, register 320 is a 2-bit register that is programmable by a controller (not shown), and that stores a value in the range of 0 to 1. The current output by amplifier 332 on line 327 is a dynamic analog threshold current, $I_{dyn}$, which is equal to the factor, d, times the current, $I_{RSSI}$.

Register 312 stores a digital value representing a desired trim level. In one embodiment, register 312 is a 5-bit register that is programmable by a controller. DAC 314 converts the digital value stored in register 312 to a corresponding analog trim current, $I_{trim}$, which is output from DAC 314 on line 315. Register 316 stores a digital value representing a desired fixed threshold level. In one embodiment, register 316 is a 4-bit register that is programmable by a controller. DAC 318 converts the digital value stored in register 316 to a corresponding analog fixed-threshold current, $I_{threshold}$, which is output from DAC 318 on line 333. In one embodiment, the value in register 316, and correspondingly the magnitude of the fixed-threshold current, $I_{threshold}$, is determined based on the actual or expected power level of the $I_{RSSI}$ signal.

Adder 330 adds the trim current, $I_{trim}$, received on line 315, and the dynamic threshold current, $I_{dyn}$, received on line 327, and outputs a sum of the received currents ($I_{trim}+I_{dyn}$) on line 329. Adder 332 adds the current ($I_{trim}+I_{dyn}$) received on line 329 and the fixed-threshold current, $I_{threshold}$, received on line 333, and outputs a sum of the received currents ($I_{threshold}+I_{trim}+I_{dyn}$) on line 331. The current ($I_{threshold}+I_{trim}+I_{dyn}$) that is output by adder 332 on line 331 is referred to herein as comparison current, $I_{comp}$.

In one embodiment, appropriate values for the registers 312, 316, and 320 are determined during a testing or configuration phase, and then stored in a non-volatile memory, such as a flash memory. In one embodiment, during power-on/start-up of the circuit 300, a controller copies the values stored in the non-volatile memory to the registers 312, 316, and 320.

The comparison current, $I_{comp}$, on line 331 is received at the negative input of current comparator 334. The received signal strength indicator current, $I_{RSSI}$, on line 325 is received at the positive input of current comparator 334. Comparator 334 continually compares the comparison current, $I_{comp}$, on line 331 to the current, $I_{RSSI}$, on line 325, and outputs a logical-high carrier detect signal on line 335 when the current, $I_{RSSI}$, exceeds the comparison current, $I_{comp}$, indicating that a carrier signal at a predefined frequency or range of frequencies is present in the signal received on lines 301. Comparator 334 outputs a logical-low carrier detect signal on line 335 when the current, $I_{RSSI}$, does not exceed the comparison current, $I_{comp}$, indicating that a carrier signal at the predefined frequency or range of frequencies is not present in the signal received on lines 301. In one embodiment, the predefined frequency is 125 kHz.

Measuring the current, $I_{RSSI}$, with a current mirror 324, and adding a dynamic current, $I_{dyn}$, to the constant or fixed threshold current, $I_{threshold}$, help to prevent the carrier detect signal output by comparator 334 from having a prolonged duration, like that shown in FIG. 2 for circuit 100. In some embodiments, the $I_{RSSI}$ signal received on line 307 includes an offset current, $I_{offset}$, due to circuit mismatches. The offset current, $I_{Offset}$, influences the carrier detection level. In one embodiment, the trim current, $I_{trim}$, is adjusted via register 312 to correspondingly adjust the carrier detector threshold level, compensate the offset current, and enhance the accuracy of the carrier detection. The multiplication by the factor, d, performed by amplifier 332, as described above, also helps to compensate any offset in the RSSI signal, and enhances the accuracy of the carrier detection without calibration of the fixed threshold, $I_{threshold}$.

Figure 4:
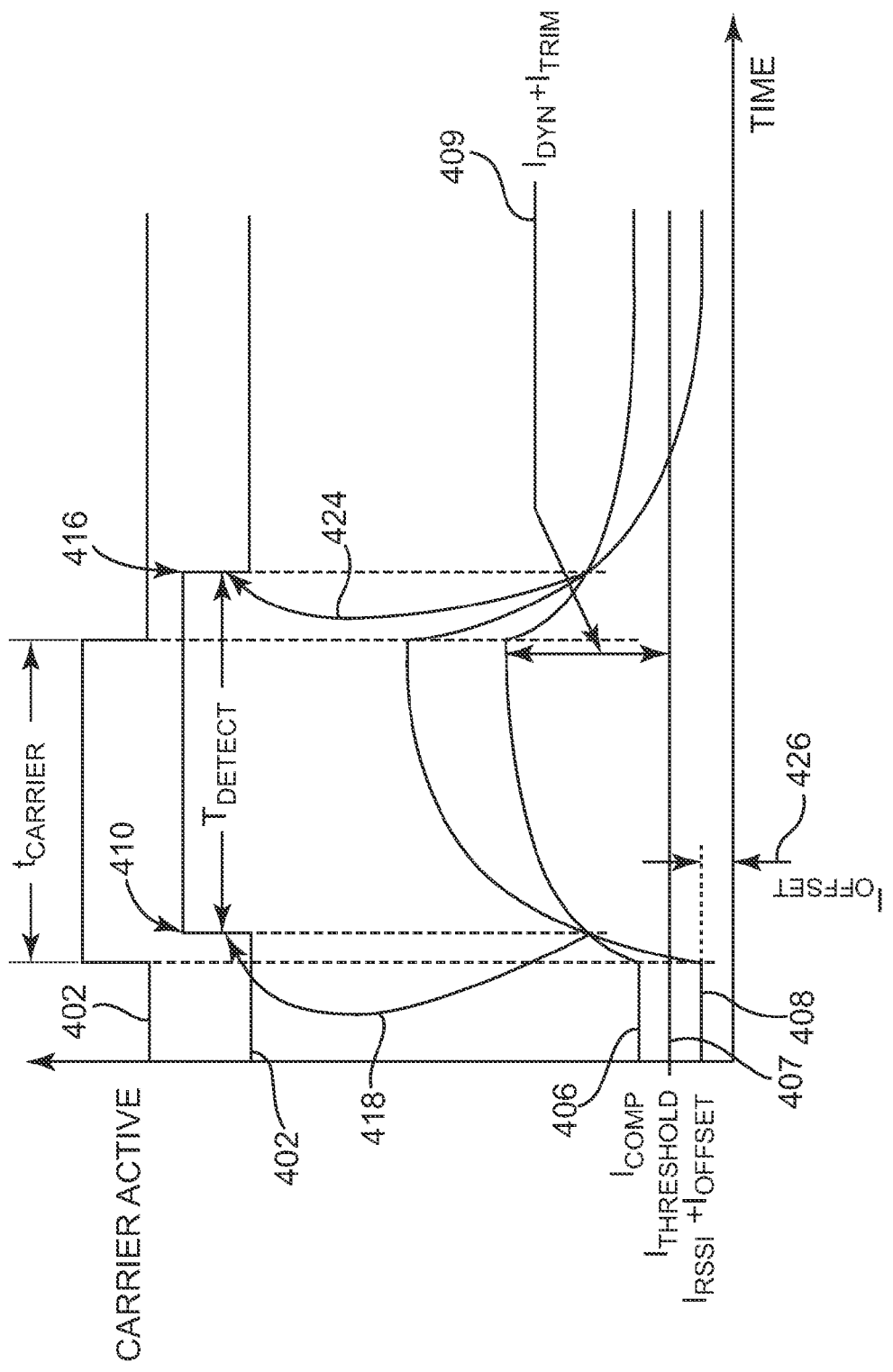
FIG. 4 is a diagram illustrating example signals generated by the receiver circuit shown in FIG. 3 according to one embodiment.

FIG. 4 is a diagram illustrating example signals generated by the receiver circuit 300 shown in FIG. 3 according to one embodiment. The signals include carrier active signal 402, carrier detect signal 404, $I_{comp}$ signal 406, $I_{threshold}$ signal 407, and $I_{RSSI}+I_{Offset}$ signal 408. Carrier active signal 402 represents the active time for a carrier signal received by circuit 300. Carrier detect signal 404 represents the signal output by comparator 334 on line 335. The $I_{comp}$ signal 406 represents the signal received by comparator 334 on line 331. The $I_{threshold}$ signal 407 represents the fixed threshold current output by DAC 318 on line 333. The $I_{RSSI}+I_{Offset}$ signal 408 represents the signal received by comparator 334 on line 325. The offset of the $I_{RSSI}+I_{Offset}$ signal 408 is represented in FIG. 4 by $I_{Offset}$ 426. The difference 409 between the $I_{comp}$ signal 406 and the $I_{threshold}$ signal 407 is equal to the current, $I_{dyn}+I_{trim}$.

As shown in FIG. 4, the carrier active signal 402 starts out in a low state, and then transitions to a high state. The carrier active signal 402 remains in the high state for a time duration represented by $t_{carrier}$, and then signal 402 transitions back to a low state. The $I_{RSSI}+I_{Offset}$ signal 408 begins with a magnitude that is less than the $I_{comp}$ signal 406. When the $I_{RSSI}+I_{Offset}$ signal 408 first transitions above the $I_{comp}$ signal 406, comparator 334 causes the carrier detect signal 404 to transition to a high state at point 410, as indicated by arrow 418. The carrier detect signal 404 remains in the high state until the $I_{RSSI}+I_{Offset}$ signal 408 drops below the $I_{comp}$ signal 406. Comparator 334 detects when the $I_{RSSI}+I_{Offset}$ signal 408 drops below the $I_{comp}$ signal 406, and causes the carrier detect signal 404 to transition to a low state at point 416, as indicated by arrow 424. The carrier detect signal 404 remains in the high state for a time duration represented by $t_{detect}$. The pulse in the carrier detect signal 404 for the time duration, $t_{detect}$, is referred to as a wakeup pulse.

Receiver circuit 300, which uses a dynamic or variable carrier detector threshold in one embodiment, provides several advantages over other carrier detecting circuits. In one embodiment, circuit 300 provides a carrier detector sensitivity level of less than 2.5 mV peak-to-peak without calibration. In one embodiment, circuit 300 produces a carrier detect signal 404 with a duration, $t_{detect}$, that correlates well with the duration, $t_{carrier}$, of the carrier signal. In one embodiment, circuit 300 is configured as a low-power (e.g., a current drain of less than 2 uA), low-frequency RF (e.g., 125 kHz), wakeup receiver that generates a carrier detect signal 404 that is used as a wakeup pulse to wakeup a microcontroller (e.g., cause the microcontroller to exit a sleep state or other reduced-power state) in a tire pressure monitoring system.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of detecting a carrier signal, comprising:
   generating a first signal that represents a strength of a received signal;
   generating a variable threshold signal based on the first signal;
   generating a fixed threshold signal; and
   detecting whether a carrier signal is present in the received signal based on a comparison of the first signal with a sum of the variable threshold signal and the fixed threshold signal, and based on a trim signal.

2. The method of claim 1, wherein the variable threshold signal and the fixed threshold signal are analog signals.

3. The method of claim 1, wherein the variable threshold signal is a variable current, and wherein the fixed threshold signal is a fixed current.

4. The method of claim 1, and further comprising:
   generating the trim signal; and
   detecting whether a carrier signal is present in the received signal based on a comparison of the first signal with a sum of the variable threshold signal, the fixed threshold signal, and the trim signal.

5. The method of claim 1, wherein generating the first signal comprises:
   amplifying the received signal; and
   demodulating the amplified received signal.

6. The method of claim 5, wherein the demodulation comprises amplitude shift key (ASK) demodulation.

7. The method of claim 1, and further comprising:
   generating a wakeup pulse when a carrier signal is detected as being present in the received signal; and
   outputting the wakeup pulse to a controller.

8. The method of claim 7, wherein the carrier signal is a low-frequency RF carrier signal.

9. The method of claim 8, wherein the carrier signal is a 125 kHz carrier signal.

10. A carrier detection circuit, comprising:
    a received signal strength indicator (RSSI) generating circuit configured to generate an RSSI signal based on a received signal;
    a first threshold generating circuit configured to generate a dynamic threshold signal that varies in accordance with the RSSI signal;
    a second threshold generating circuit configured to generate a fixed threshold signal; and
    a comparison circuit configured to compare the RSSI signal with a sum of the dynamic threshold signal and the fixed threshold signal, and output a carrier detect signal based on the comparison and based on a trim signal.

11. The carrier detection circuit of claim 10, wherein the first threshold generating circuit comprises a current mirror configured to generate first and second RSSI current signals based on the RSSI signal.

12. The carrier detection circuit of claim 11, wherein the first threshold generating circuit further comprises a current-to-voltage converter configured to convert the first RSSI current signal to an RSSI voltage signal.

13. The carrier detection circuit of claim 12, wherein the first threshold generating circuit further comprises a low-pass filter circuit configured to filter the RSSI voltage signal.

14. The carrier detection circuit of claim 13, wherein the first threshold generating circuit further comprises an amplifier configured to amplify the low-pass filtered RSSI voltage signal and generate a dynamic threshold current.

15. The carrier detection circuit of claim 14, wherein the first threshold generating circuit comprises a register configured to store a value, and wherein the amplifier is configured to amplify the low-pass filtered RSSI voltage signal based on the stored value.

16. The carrier detection circuit of claim 14, wherein the second threshold generating circuit comprises a threshold current generator configured to generate a fixed threshold current.

17. The carrier detection circuit of claim 16, wherein the first threshold generating circuit further comprises at least one adder configured to add the dynamic threshold current and the fixed threshold current, and thereby generate a sum of currents.

18. The carrier detection circuit of claim 17, wherein the comparison circuit comprises a current comparator configured to compare the second RSSI current signal with the sum of currents generated by the at least one adder.

19. The carrier detection circuit of claim 16, wherein the first threshold generating circuit further comprises a trim current generator configured to generate the trim current.

20. The carrier detection circuit of claim 19, wherein the first threshold generating circuit further comprises at least one adder configured to add the dynamic threshold current, the fixed threshold current, and the trim current, and thereby generate a sum of currents.

21. The carrier detection circuit of claim 20, wherein the comparison circuit comprises a current comparator configured to compare the second RSSI current signal with the sum of currents generated by the at least one adder.

22. A carrier detection circuit, comprising:
an amplification and demodulation circuit configured to amplify and demodulate a received low-frequency RF signal, and thereby generate a received signal strength indicator (RSSI) signal;
a dynamic threshold generator configured to filter and amplify the RSSI signal, and thereby generate a dynamic threshold signal; and
a comparator configured to compare the RSSI signal with a sum of the dynamic threshold signal, a fixed threshold signal, and a trim signal, and output a carrier detect signal based on the comparison.

* * * * *